(12) United States Patent
Sharma et al.

(10) Patent No.: US 11,225,995 B1
(45) Date of Patent: Jan. 18, 2022

(54) 360 DEGREE DOUBLE CARABINER

(71) Applicants: Naveen Sharma, Murfreesboro, TN (US); Anjaney Sharma, Murfreesboro, TN (US)

(72) Inventors: Naveen Sharma, Murfreesboro, TN (US); Anjaney Sharma, Murfreesboro, TN (US)

( * ) Notice: Subject to any disclaimer, the term of this patent is extended or adjusted under 35 U.S.C. 154(b) by 0 days.

(21) Appl. No.: 17/036,523

(22) Filed: Sep. 29, 2020

(51) Int. Cl.
*F16B 45/02* (2006.01)

(52) U.S. Cl.
CPC ............ *F16B 45/02* (2013.01); *F16B 45/023* (2021.05); *Y10T 24/3487* (2015.01)

(58) Field of Classification Search
CPC ............. Y10T 24/3485; Y10T 24/3493; Y10T 24/3487; Y10T 24/3488; F16B 45/02; F16B 45/037; F16B 45/06; F16B 45/059; F16B 45/00
See application file for complete search history.

(56) References Cited

U.S. PATENT DOCUMENTS

| | | | | |
|---|---|---|---|---|
| 4,577,374 A * | 3/1986 | Lii | ................ | A44B 11/28 24/165 |
| 7,077,445 B2 * | 7/2006 | Yu | ................ | F16B 45/02 294/82.19 |
| 9,453,527 B2 * | 9/2016 | Yoo | ................ | A47G 29/083 |
| 10,584,736 B2 * | 3/2020 | Ormsbee | ................ | F16B 1/00 |
| 2006/0107499 A1 * | 5/2006 | Wu | ................ | F16B 45/00 24/370 |
| 2008/0083862 A1 * | 4/2008 | Salatka | ................ | A47G 29/083 248/308 |

* cited by examiner

*Primary Examiner* — Robert Sandy
(74) *Attorney, Agent, or Firm* — Maier & Maier, PLLC

(57) ABSTRACT

A 360-degree double carabiner includes an outer-carabiner, an inner-carabiner and a swivel joint including a swivel cylinder and two locking pins. The outer-carabiner is enabled into a horizontal hole, the inner-carabiner is enabled into a vertical hole, the two locking pins are enabled into two smaller holes of the swivel cylinder to lock the outer-carabiner and the inner-carabiner to the swivel cylinder. The 360-degree double carabiner includes an outer latch, wherein one end of the outer latch is fixed to a proximal end of the outer-carabiner and another end of the outer latch rests on a distal end of the outer-carabiner. The 360-degree double carabiner includes an inner latch, wherein one end of the inner latch is fixed to a proximal end of the inner-carabiner, another end of the inner latch rests on a distal end of the inner-carabiner.

9 Claims, 15 Drawing Sheets

360 DEGREE DOUBLE CARABINER

FIELD

The present invention relates to a carabiner and more particularly related to a 360-degree double carabiner with a swivel assembly.

BACKGROUND

Generally, carabiners enable a person to hang items of different types to different surfaces in order to free their hands for other activities. These kinds of carabiner are very useful for travelers, hikers, and many others. The conventional mechanisms, wherein some hanging systems include hook and gated-loops systems composed of a hook connected to a gated loop by way of a rotatable hinge. However, these conventional hanging systems do not have option for closed (secure) carabiner on both the ends, thus these kind of hanging systems may result in object or item fall down and may result in damage to the objects or items due the missing of the secure carabiner on both the ends. These conventional carabiner support only one type of configuration and thus results less versatile in handling variety of objects and surfaces.

In yet another conventional mechanism, wherein the double carabiners include a first carabiner portion and a second carabiner portion. The first and second carabiner portions are attached to each other via a locking sleeve. However, the movement of these conventional mechanism are restricted to only one axis. Thus, these kinds of conventional double carabiners are failed to rotate in all the directions.

In yet another conventional mechanism, wherein 360 double carabiners, wherein the swivel configuration uses multiple components for 360-degree swivel actions. For example, the components can be but not limited to a lower arm, upper arm, locking pins, screw, or the like. Thus, the multiple components result in complex configurations and complex assembly of the 360 double carabiners.

SUMMARY

Accordingly, the embodiments herein provide a 360-degree double carabiner comprising an outer carabiner, an inner carabiner, a swivel joint consisting of a swivel cylinder and two locking pins, wherein the outer carabiner is enabled into a horizontal hole and the inner carabiner is enabled into a vertical hole of the swivel cylinder. Further, the two locking pins are enabled into two smaller holes present in the swivel cylinder to lock the outer carabiner and the inner carabiner to the swivel cylinder. Further, the 360-degree double carabiner includes an outer latch, wherein one end of the outer latch is fixed to the proximal end of the outer carabiner and another end of the outer latch rests on the distal end of the outer carabiner. The outer latch is enabled to operate between an open position and a closed position to lock and unlock the outer latch at the distal end of the outer carabiner. Further, the 360-degree double carabiner includes an inner latch, wherein one end of the inner latch is fixed to the proximal end of the inner carabiner and another end of the inner latch rests on the distal end of the inner carabiner. The inner latch is enabled to operate between an open position and a closed position to lock and unlock the inner latch at the distal end of the inner carabiner.

In an embodiment, the swivel joint with the swivel cylinder and the two locking pins, enables the 360-degree motion of the outer carabiner and the inner carabiner.

In an embodiment, the two locking pins are replaced with retaining rings for locking the inner carabiner and the outer carabiner with the swivel cylinder.

In an embodiment, the retaining rings is one of a constant section retaining ring, a spiral retaining ring and a hoop ring.

In an embodiment, the inner carabiner restricts the swivel cylinder, the inner carabiner assembly from moving left or right and also prevents the inner carabiner from accidently coming out of the outer carabiner.

In an embodiment, the inner carabiner is folded inside the outer carabiner and thus makes the 360-degree double carabiner a portable device.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
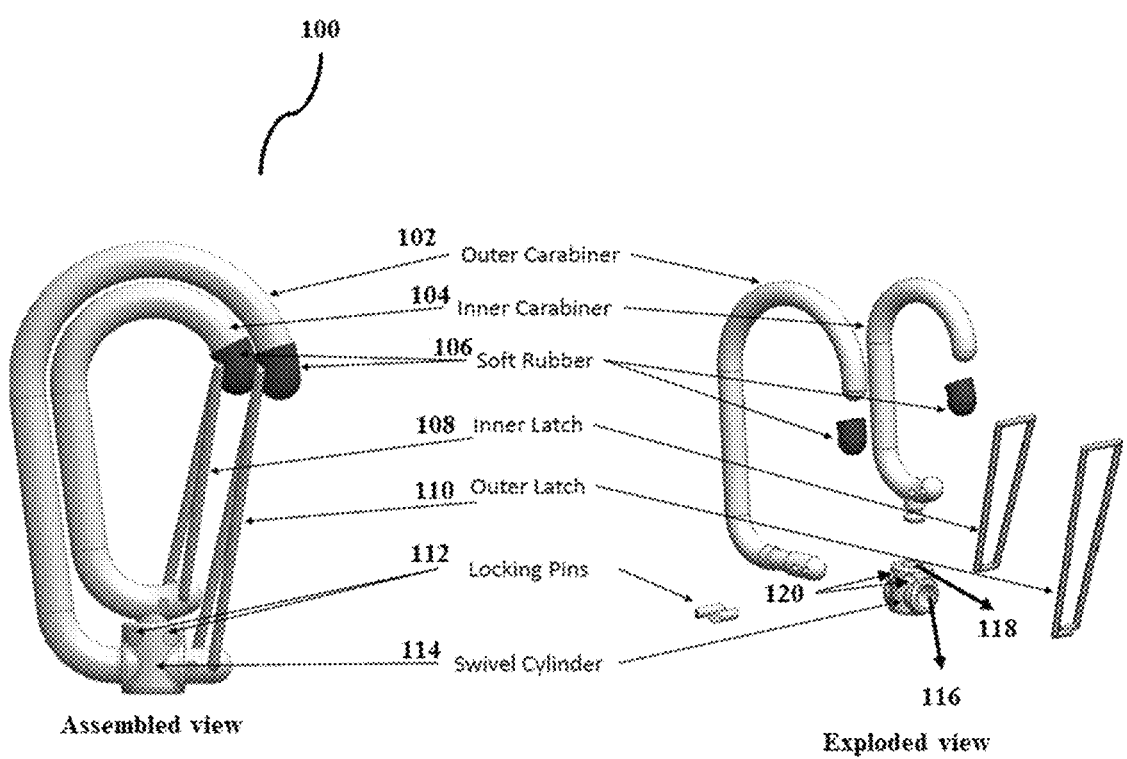
FIG. 1 illustrates an assembled view and exploded view of a 360-degree double carabiner with locking pins, according to an embodiment as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted, so as not to unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The phrase "locking pins" and "two locking pins" are interchangeably used throughout the specification.

Accordingly, the embodiments herein provide a 360-degree double carabiner comprising an outer carabiner, an inner carabiner, a swivel joint consisting of a swivel cylinder and two locking pins, wherein the outer carabiner is enabled into a horizontal hole and the inner carabiner is enabled into a vertical hole of the swivel cylinder. Further, the two locking pins are enabled into two smaller holes present in the swivel cylinder to lock the outer carabiner and the inner carabiner to the swivel cylinder. Further, the 360-degree double carabiner includes an outer latch, wherein one end of the outer latch is fixed to the proximal end of the outer carabiner and another end of the outer latch rests on the distal end of the outer carabiner. The outer latch is enabled to operate between an open position and a closed position to lock and unlock the outer latch at the distal end of the outer carabiner. Further, the 360-degree double carabiner includes an inner latch, wherein one end of the inner latch is fixed to the proximal end of the inner carabiner and another end of the inner latch rests on the distal end of the inner carabiner. The inner latch is enabled to operate between an open position and a closed position to lock and unlock the inner latch at the distal end of the inner carabiner. Referring now to the drawings, and more particularly to FIGS. 1 through 10, where similar reference characters denote corresponding features consistently throughout the figures, there are shown example embodiments.

FIG. 1 illustrates an assembled view and exploded view of a 360-degree double carabiner 100 with locking pins 112, according to an embodiment as disclosed herein. The 360-degree double carabiner 100 comprising an outer carabiner 102, an inner carabiner 104 and a swivel joint. The swivel joint further comprising a swivel cylinder 114 and two locking pins 112. The outer carabiner 102 is enabled into a horizontal hole 116 and the inner carabiner 104 is enabled into a vertical hole 118 of the swivel cylinder 114. Further, the two locking pins 112 are enabled into two smaller holes 120 present in the swivel cylinder 114 to lock the outer carabiner 102 and the inner carabiner 104 to the swivel cylinder 114. Further, the 360-degree double carabiner 100 includes an outer latch 110, wherein one end of the outer latch 110 is fixed to the proximal end of the outer carabiner 102 and another end of the outer latch 102 rests on the distal end of the outer carabiner 102. The outer latch 110 is enabled to operate between an open position and a closed position to lock and unlock the outer latch 110 at the distal end of the outer carabiner 102. Further, the 360-degree double carabiner 102 includes an inner latch 108, wherein one end of the inner latch 108 is fixed to the proximal end of the inner carabiner 104 and another end of the inner latch 108 rests on the distal end of the inner carabiner 104. The inner latch 108 is enabled to operate between an open position and a closed position to lock and unlock the inner latch 108 at the distal end of the inner carabiner 104. In an embodiment, the swivel joint with the swivel cylinder 114 and the two locking pins 112, enables the 360-degree motion of the outer carabiner 102 and the inner carabiner 104. In an embodiment, the two locking pins 112 are replaced with retaining rings for locking the inner carabiner 104 and the outer carabiner 102 with the swivel cylinder 114. In an embodiment, the retaining ring is one of a constant section retaining ring, a spiral retaining ring and a hoop ring. In an embodiment, the inner carabiner 104 restricts the swivel cylinder 114, the inner carabiner 104 assembly from moving left or right. Further, it also prevents the inner carabiner 104 from accidently coming out of the outer carabiner 102. In an embodiment, the inner carabiner 104 is folded inside the outer carabiner 102 and thus makes the 360-degree double carabiner 100 a portable device. In an embodiment, the 360-degree double carabiner 100 can be made of an Aluminum Alloy, a Carbon Steel, a Stainless steel, a plastic or the like. Based on the Finite Element Analysis (FEA), the 360-degree double carabiner 100 can have a load capacity of 750 N (75 kg) at an yield point and can have the load capacity of 1380 N (138 kg) at a break point of the 360 degree double carabiner 100.

Unlike conventional mechanisms, the 360-degree double carabiner 100, wherein the swivel design is simple and uses only two components (i.e., Swivel Cylinder 114 and Locking Pins 112) for 360-degree swivel action. Thus, the 360-degree double carabiner 100 is a simple in assembly.

Figure 2:
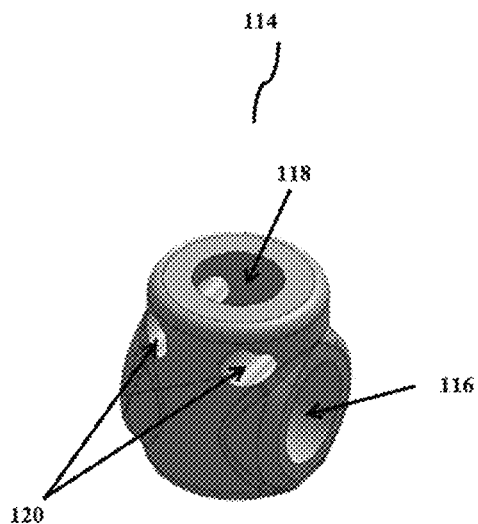
FIG. 2 illustrates a swivel cylinder of a 360-degree double carabiner, according to an embodiment as disclosed herein.
Figure 3:
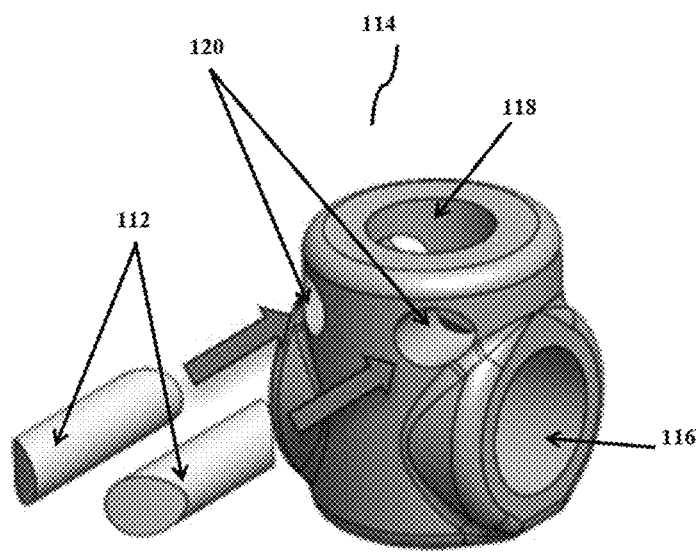
FIG. 3 illustrates a swivel cylinder of a 360-degree double carabiner, according to an embodiment as disclosed herein.

FIGS. 2 and 3 illustrates the swivel cylinder of the 360-degree double carabiner 100, according to an embodiment as disclosed herein. The outer carabiner 102 and the inner carabiner 104 are connected through the swivel joint, wherein the swivel joint consists of two components i.e. the swivel cylinder 114 and the two locking pins 112. The swivel cylinder 114 includes two big holes, one is a vertical hole 118 and other one is a horizontal hole 116, wherein the outer carabiner 102 is inserted in the horizontal hole 116 and the inner carabiner 104 is inserted in the vertical hole 118 of the swivel cylinder 114. Further, the swivel cylinder 114 includes two smaller holes 120 in which locking pins 112 can be inserted to lock the outer carabiner 102 and the inner carabiner 104 into the swivel cylinder 114 to enable the complete carabiner assembly.

Figures 4A, 4B:
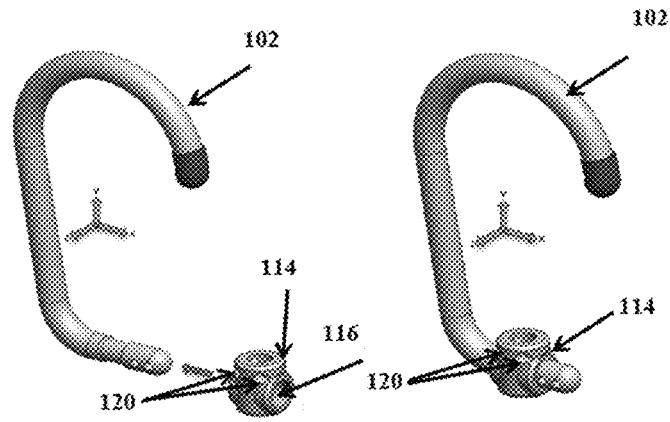
FIG. 4a illustrates a step by step assembly of a 360-degree double carabiner, according to an embodiment as disclosed herein.
FIG. 4b illustrates a step by step assembly of a 360-degree double carabiner, according to an embodiment as disclosed herein.
Figures 4C, 4D:
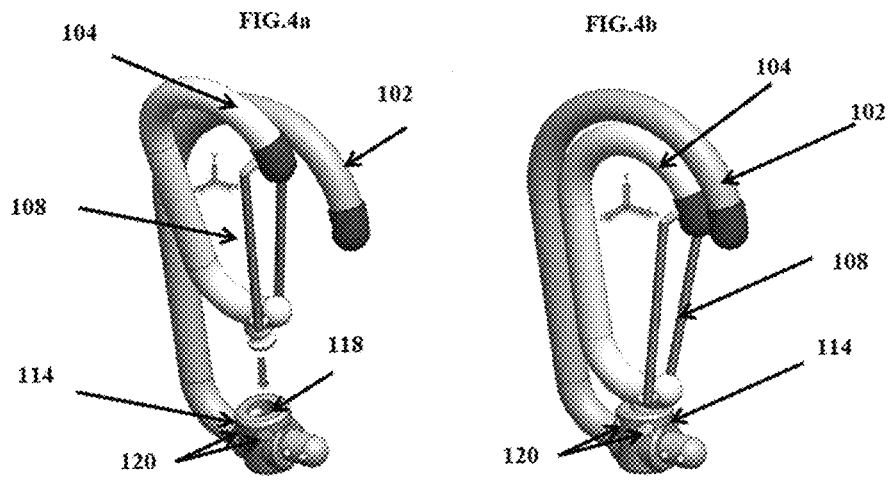
FIG. 4c illustrates a step by step assembly of a 360-degree double carabiner, according to an embodiment as disclosed herein.
FIG. 4d illustrates a step by step assembly of a 360-degree double carabiner, according to an embodiment as disclosed herein.
Figures 4E, 4F:
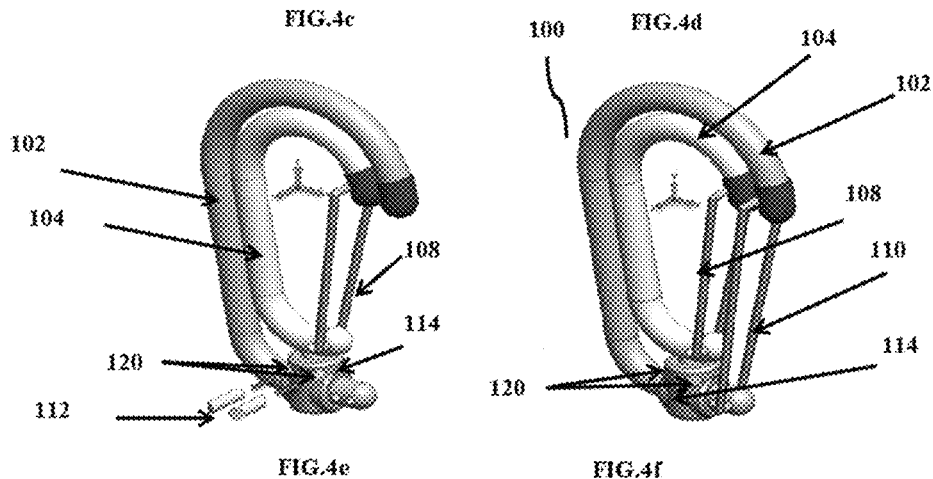
FIG. 4e illustrates a step by step assembly of a 360-degree double carabiner, according to an embodiment as disclosed herein.
FIG. 4f illustrates a step by step assembly of a 360-degree double carabiner, according to an embodiment as disclosed herein.

FIGS. 4a-4f illustrates a step by step assembly of the 360-degree double carabiner 100, according to an embodiment as disclosed herein. The 360-degree double carabiner 100 comprises the outer carabiner 102, the inner carabiner 104, a swivel joint consisting of a swivel cylinder 114, two locking pins 112, the outer latch 110, and the inner latch 108. The 360-degree double carabiner 100, wherein the outer carabiner 102 can be configured to insert into the horizontal hole 116 of the swivel cylinder 114 (as shown in FIG. 4a and FIG. 4b). Further, the inner carabiner 104 can be configured to insert into the vertical hole 118 of the swivel cylinder 114. Further, one end of the inner latch 108 can be fixed at the proximal end of the inner carabiner 104 and another end of the inner latch 108 rests on the distal end of the inner carabiner 104. The inner latch is enabled to operate between an open position and a closed position to lock and unlock the inner latch at the distal end of the inner carabiner as shown in FIG. 4c and FIG. 4d. Further, on inserting the outer carabiner 102 and the inner carabiner 104 into the horizontal hole 116 and the vertical hole 118 of the swivel cylinder 114 respectively, the two locking pins 112 can be inserted into the small holes 120 present in the swivel cylinder 114 to lock the outer carabiner 102 and the inner carabiner 104 into the swivel cylinder 114. Further, the outer latch 110 can be fixed to the outer carabiner 102, wherein one end of the outer latch 110 can be fixed to the proximal end of the outer carabiner 102 and another end of the outer latch 110 rests on the distal end of the outer carabiner 102. The outer latch is enabled to operate between an open position and a closed position to lock and unlock the outer latch 110 at the distal end of the outer carabiner 102 (as shown in FIG. 4e and FIG. 4f).

Figure 5:
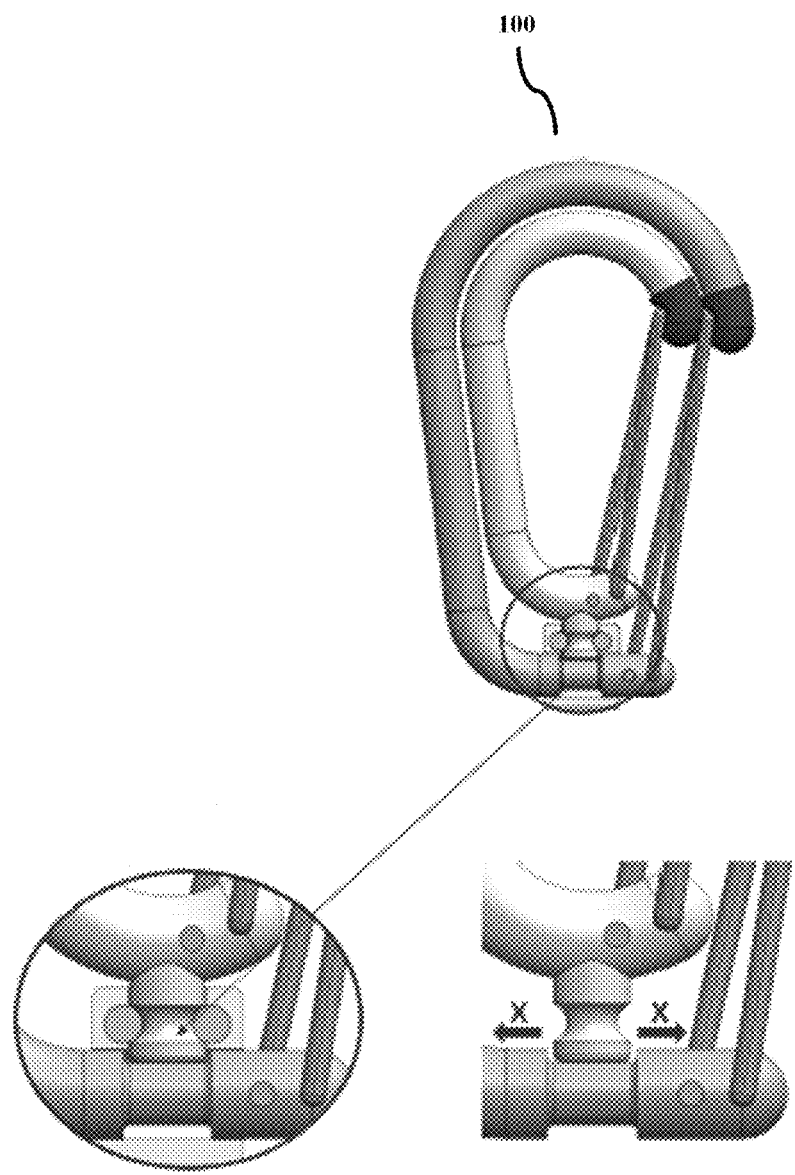
FIG. 5 illustrates an inner carabiner design for restricting a movement of a swivel cylinder and an inner carabiner, according to an embodiment as disclosed herein.

FIG. 5 illustrates an inner carabiner 104 design for restricting the movement of the swivel cylinder 114 and the inner carabiner 104, according to an embodiment as disclosed herein. A unique inner carabiner 104 design shown in the FIG. 5 restricts the swivel cylinder 114 and inner carabiner 104 assembly from moving left or right. Further, the inner carabiner 104 design prevents the inner carabiner 104 from accidently coming out of the outer carabiner 102.

Figure 6:
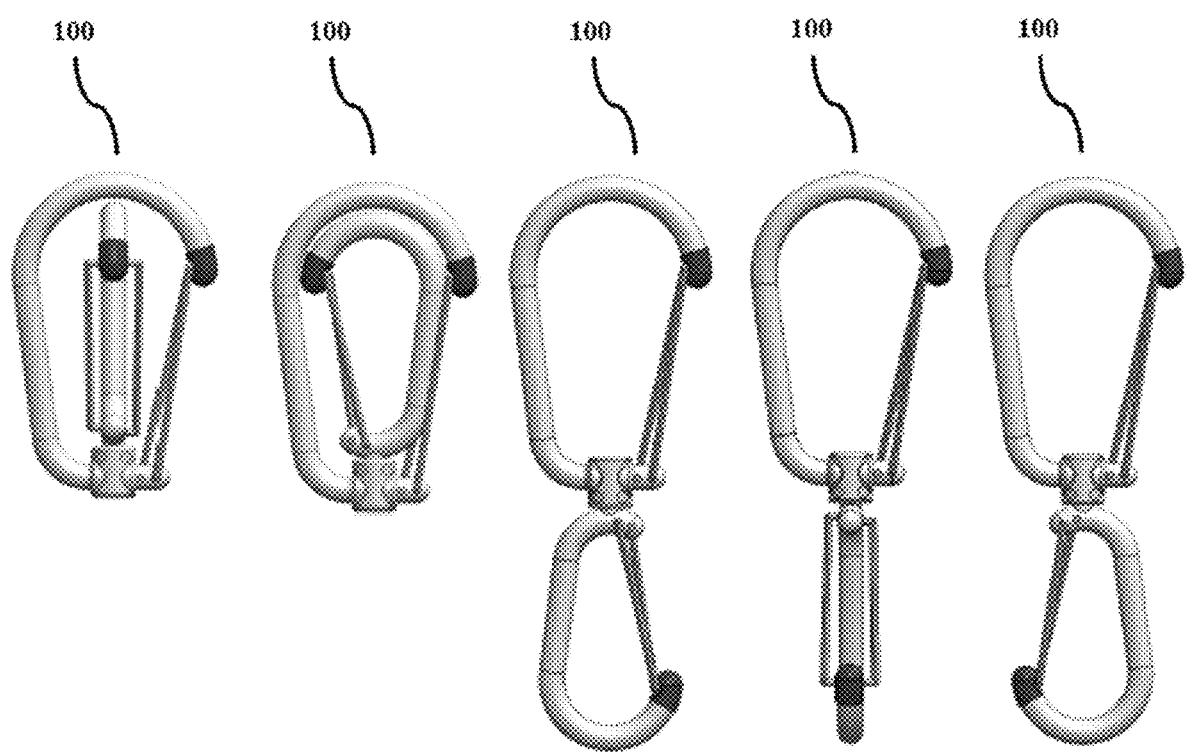
FIG. 6 illustrates a 360-degree rotations of a 360-degree double carabiner, according to an embodiment as disclosed herein.

FIG. 6 illustrates the 360-degree rotations of the 360-degree double carabiner 100, according to an embodiment as disclosed herein. The swivel joint design allows the 360-degree motion of the outer carabiner 102 and the inner carabiner 104. The unique swivel joint uses swivel cylinder 114 and the locking pins 112 to achieve the 360-degree rotations of the double carabiner 100. The 360-degree double carabiner 100, wherein the outer carabiner 102 can enabled into the horizontal hole 116 and the inner carabiner 104 is enabled into the vertical hole 118 of the swivel cylinder 114, wherein the locking pins 112 are enabled into two smaller holes 120 present in the swivel cylinder 114 to lock the outer carabiner and the inner carabiner to the swivel cylinder. Thus, the configuration of the 360-degree double carabiner detailed above enables the outer carabiner 102 and the inner carabiner 104 to rotate in all the possible angles as shown in FIG. 6.

Figure 7:
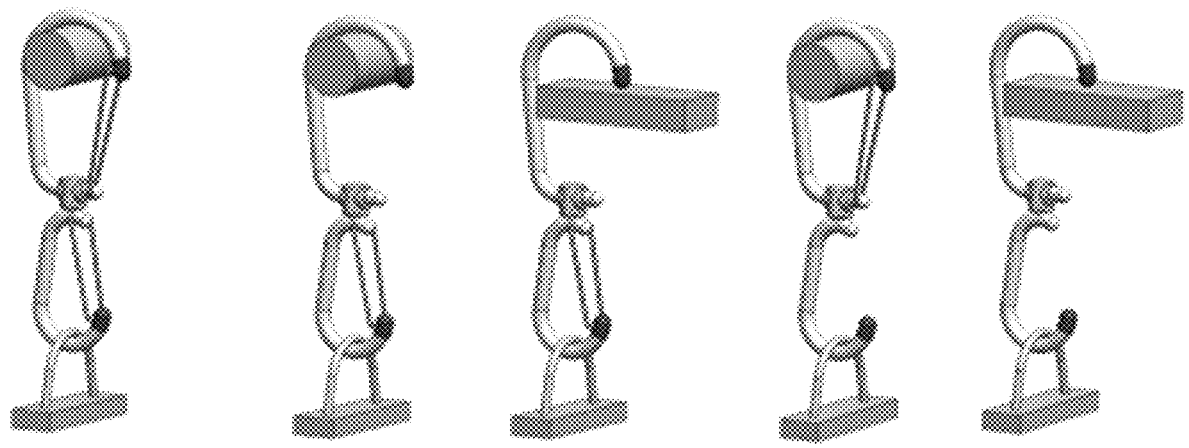
FIG. 7 is an example illustration of the 360-degree double carabiner used with different kind of surfaces, according to an embodiment as disclosed herein.

FIG. 7 is an example illustration of the 360-degree double carabiner 100 used with different kind of surfaces, according to an embodiment as disclosed herein. The swivel joint can be implemented with two carabiners such as the outer carabiner 102 and the inner carabiner 104, Wherein, one end of the carabiner (either inner carabiner or outer carabiner) can securely hold one object like handbag, tools, helmet etc. and the other end of the carabiner (either inner carabiner or outer carabiner) can securely attached to several different kind of surfaces as shown in FIG. 7. Thus, the 360-degree double carabiner frees up persons hand and allow them to use their hands for other activities.

Figure 8A:
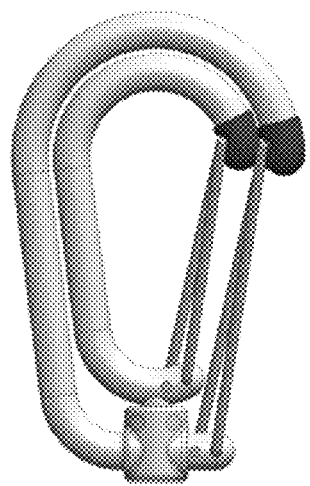
FIG. 8a illustrates a different configuration of the 360-degree double carabiner, according to an embodiment as disclosed herein.
Figure 8B:
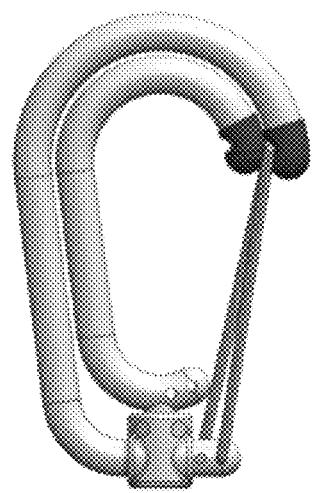
FIG. 8b illustrates a different configuration of the 360-degree double carabiner, according to an embodiment as disclosed herein.
Figure 8C:
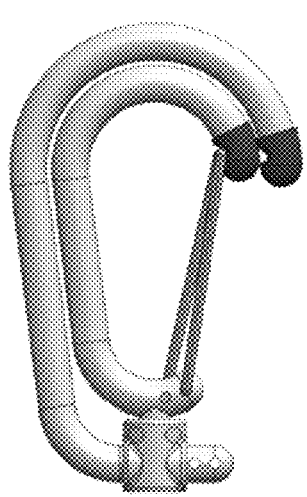
FIG. 8c illustrates a different configuration of the 360-degree double carabiner, according to an embodiment as disclosed herein.
Figure 8D:
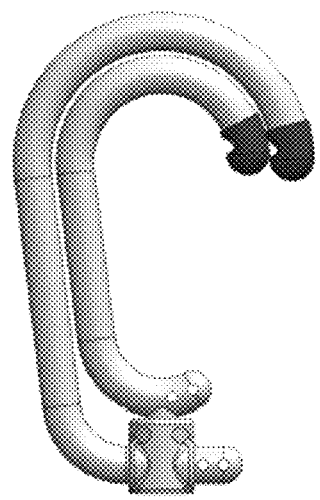
FIG. 8d illustrates different a configuration of the 360-degree double carabiner, according to an embodiment as disclosed herein.

FIGS. 8a-8d illustrates different configurations of the 360-degree double carabiner 100, according to an embodiment as disclosed herein. The 360-degree double carabiner 100 can be able to rotate in all angles, thus the 360-degree double carabiner 100 can be used in different configurations. The 360-degree double carabiner can be configured into four configurations. FIG. 8a depicts the 360-degree double carabiner 100, wherein the inner carabiner 104 and the outer carabiners 102 are secured. Further, FIG. 8b depicts the 360-degree double carabiner 100, wherein the outer carabiner 102 is secured, and the inner carabiner 104 can act as one inner hook. Further, FIG. 8c depicts the 360-degree double carabiner 100, wherein the inner carabiner 104 is secured, and the outer carabiner 102 can act as one outer hook. Similarly, FIG. 8d depicts the 360-degree double carabiner 100, wherein the inner carabiner 104 and the outer carabiner 102 can act as two hooks. Thus, the 360-degree double carabiner 100 can be used in different configurations.

Figure 9:
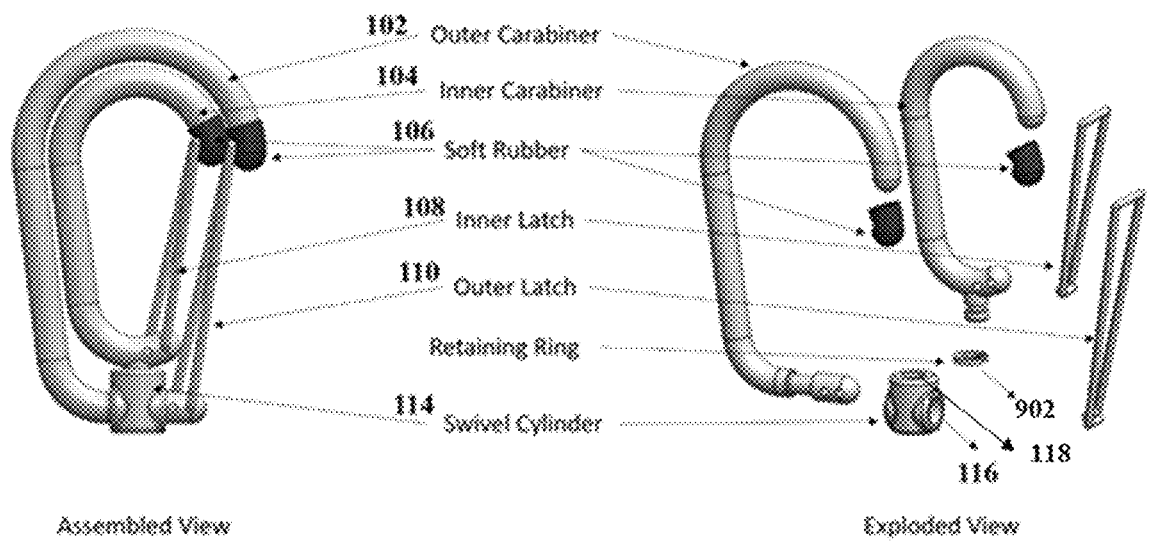
FIG. 9 illustrates an assembled view and an exploded view of a 360-degree double carabiner with a retaining ring, according to an embodiment as disclosed herein.

FIG. 9 illustrates the assembled view and the exploded view of the 360-degree double carabiner 100 with the retaining ring 902, according to an embodiment as disclosed herein. The embodiments herein, wherein the two locking pins 112 are replaced with the retaining ring 902 for locking the inner carabiner 104 and the outer carabiner 102 with the swivel cylinder 114. Therefore, pin holes are not needed in the swivel cylinder 114 when the retaining ring 902 is used.

Figure 10:
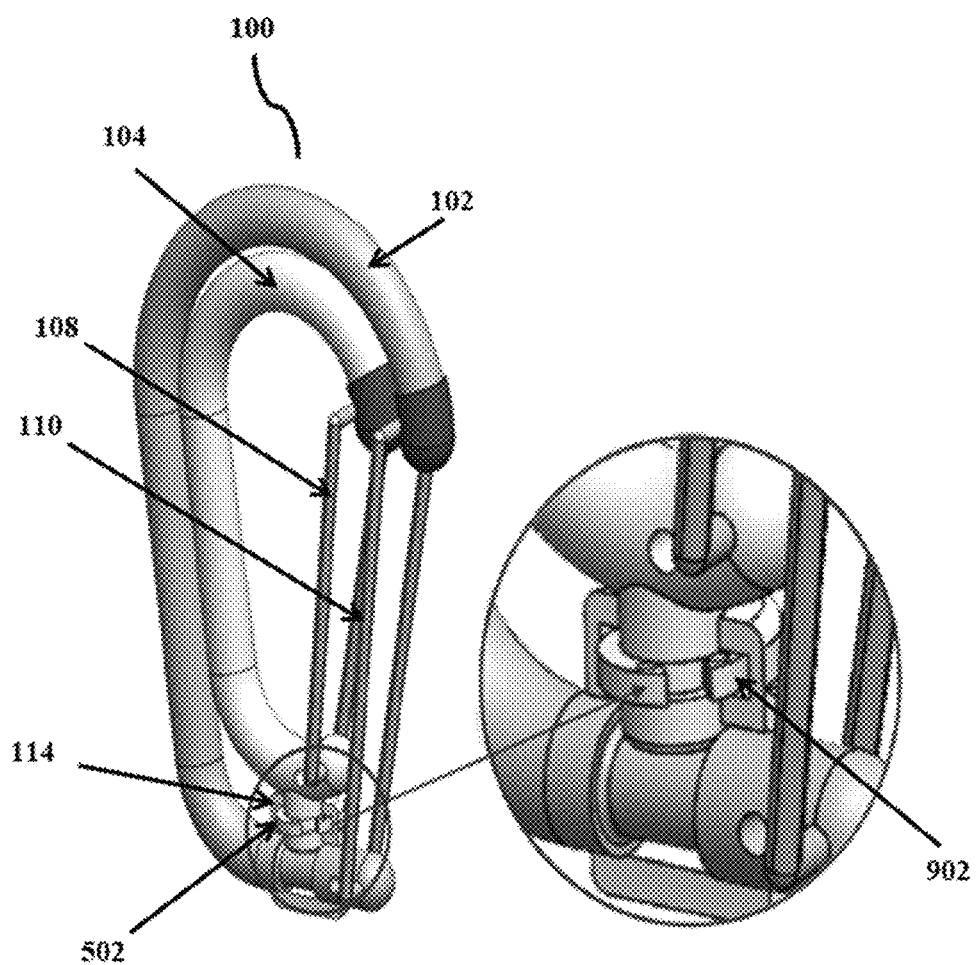
FIG. 10 illustrates a configuration of a retaining ring for locking an inner carabiner to the swivel cylinder, according to an embodiment as disclosed herein.

FIG. 10 illustrates the configuration of the retaining ring 902 for locking inner carabiner 104 to the swivel cylinder 114, according to an embodiment as disclosed herein. The two locking pins 112 can be used for locking the outer carabiner 102 and the inner carabiner 104 to the swivel cylinder 114. However, in an embodiment the two locking pins 112 can be replaced with the retaining ring 902 for locking the inner carabiner 104 to the swivel cylinder 114. Thus, pin holes are not needed in the swivel cylinder 114 when the retaining ring 902 is used.

Figure 11:
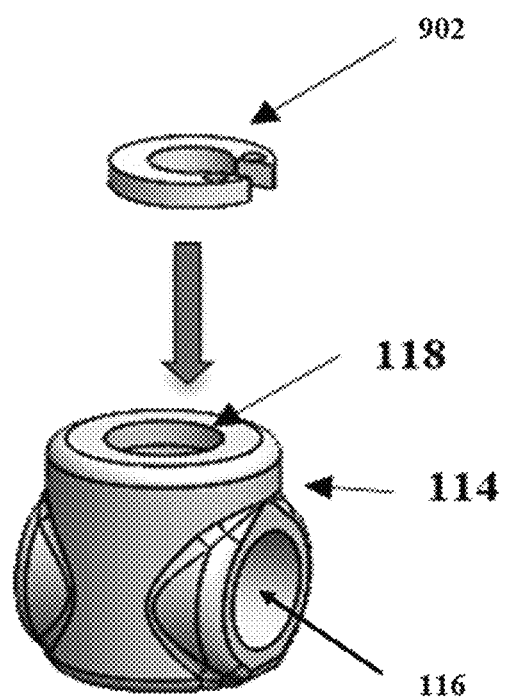
FIG. 11 illustrates the swivel cylinder with a retaining ring for locking the inner carabiner and the outer carabiner, according to an embodiment as disclosed herein.

FIG. 11 illustrates the swivel cylinder 114 with the retaining ring 902 for locking the inner carabiner 104 and the outer carabiner 102, according to an embodiment as disclosed herein. The outer carabiner 102 and the inner carabiner 104 can be connected through the swivel joint. The swivel cylinder 114 includes two big holes, one is the vertical hole 118 and other one is the horizontal hole 116, wherein the outer carabiner 102 can be inserted into the horizontal hole 116 and the inner carabiner 104 can be inserted into the vertical hole 118 of the swivel cylinder 114. Further, the outer carabiner 102 and the inner carabiner 104 can be locked with the help of retaining ring 902 to enable the complete carabiner assembly.

Figure 12A:
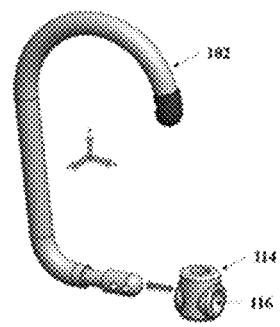
FIG. 12a illustrates a step by step assembly of the 360-degree double carabiner with the retaining ring, according to an embodiment as disclosed herein.
Figure 12B:
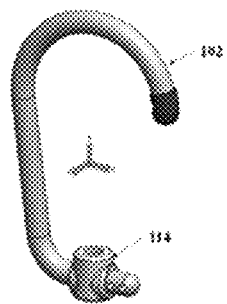
FIG. 12b illustrates a step by step assembly of the 360-degree double carabiner with the retaining ring, according to an embodiment as disclosed herein.
Figure 12C:
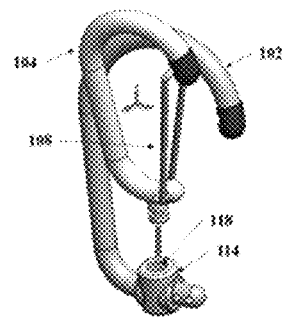
FIG. 12c illustrates a step by step assembly of the 360-degree double carabiner with the retaining ring, according to an embodiment as disclosed herein.
Figure 12D:
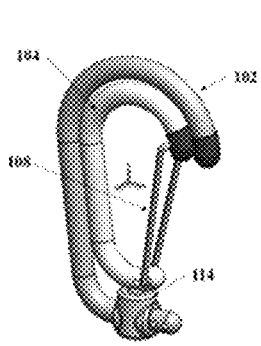
FIG. 12d illustrates a step by step assembly of the 360-degree double carabiner with the retaining ring, according to an embodiment as disclosed herein.
Figure 12E:
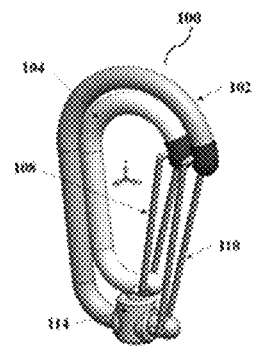
FIG. 12e illustrates a step by step assembly of the 360-degree double carabiner with the retaining ring, according to an embodiment as disclosed herein.

FIGS. 12a-12e illustrates the step by step assembly of the 360-degree double carabiner 100 with the retaining ring 902, according to an embodiment as disclosed herein. The 360-degree double carabiner 100 comprises the outer carabiner 102, the inner carabiner 104, the swivel joint consisting of the swivel cylinder 114, the retaining ring 902, the outer latch 110, and the inner latch 108. The 360-degree double carabiner 100, wherein the outer carabiner 102 can be configured to insert into the horizontal hole 116 of the swivel cylinder 114 (as shown in FIG. 12a and FIG. 12b). Further, the inner carabiner 104 can be configured to insert into the vertical hole 118 of the swivel cylinder 114. Further, one end of the inner latch 108 can be fixed at the proximal end of the inner carabiner 104 and another end of the inner latch 108 rests on the distal end of the inner carabiner 104. The inner latch is enabled to operate between an open position and a closed position to lock and unlock the inner latch at the distal end of the inner carabiner as shown in FIG. 12c and FIG. 12d. Further, on inserting the outer carabiner 102 and the inner carabiner 104 into the horizontal hole 116 and the vertical hole 118 of the swivel cylinder 114 respectively, the retaining ring 902 can be configured to lock the outer carabiner 102 and the inner carabiner 104 into the swivel cylinder 114. Further, the outer latch 110 can be fixed to the outer carabiner 102, wherein one end of the outer latch 110 can be fixed to the proximal end of the outer carabiner 102 and another end of the outer latch 110 rests on the distal end of the outer carabiner 102. The outer latch is enabled to operate between an open position and a closed position to lock and unlock the outer latch 110 at the distal end of the outer carabiner 102 (as shown in FIG. 12e).

Figure 13:
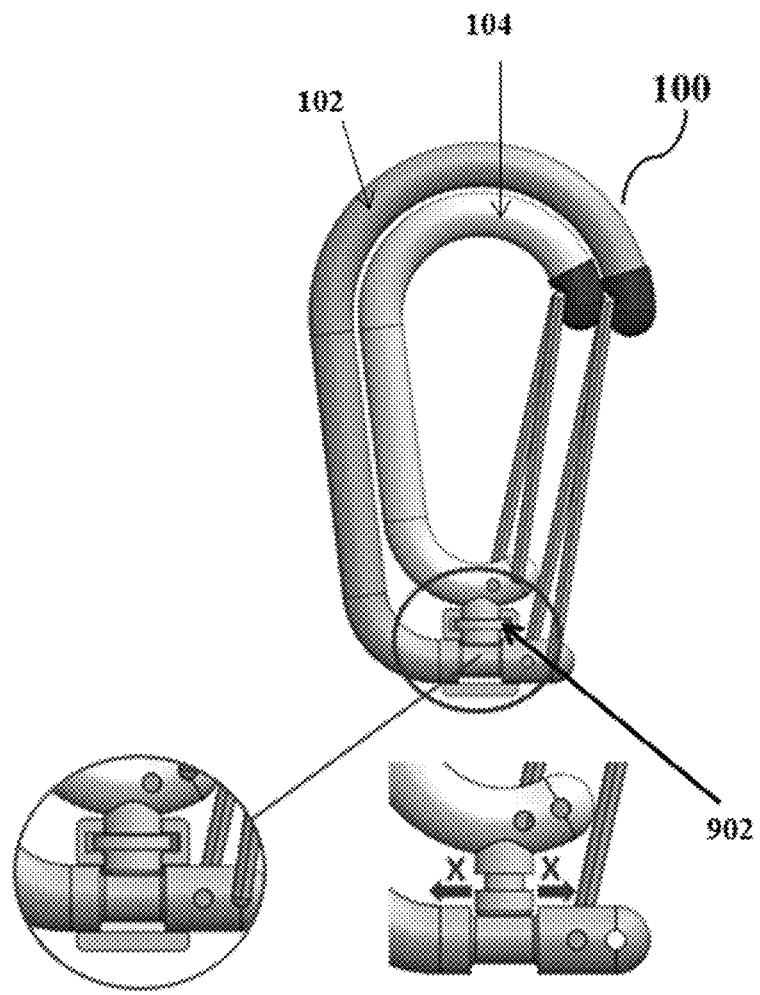
FIG. 13 illustrates an inner carabiner design with the retaining ring for restricting the movement of the swivel cylinder and the inner carabiner, according to an embodiment as disclosed herein.

FIG. 13 illustrates the inner carabiner 104 design with the retaining ring 902 for restricting the movement of the swivel cylinder 114 and the inner carabiner 104, according to an embodiment as disclosed herein. A unique inner carabiner 104 design with the retaining ring 902 as shown in the FIG. 13 restricts the swivel cylinder 114 and inner carabiner 104 assembly from moving left or right. Further, the inner carabiner 104 design prevents the inner carabiner 104 from accidently coming out of the outer carabiner 102.

Figure 14A:
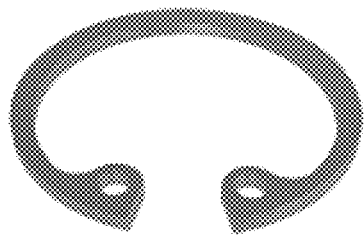
FIG. 14a illustrates different types of retaining rings for locking the inner carabiner with swivel cylinder, according to an embodiment as disclosed herein.
Figure 14B:
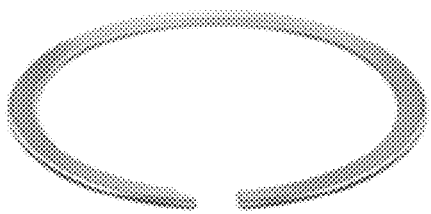
FIG. 14b illustrates different types of retaining rings for locking the inner carabiner with swivel cylinder, according to an embodiment as disclosed herein.
Figure 14C:
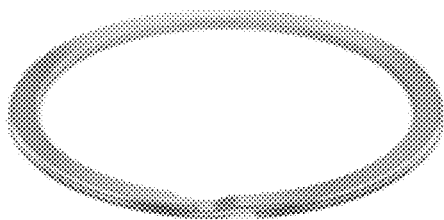
FIG. 14c illustrates different types of retaining rings for locking the inner carabiner with swivel cylinder, according to an embodiment as disclosed herein.
Figure 14D:
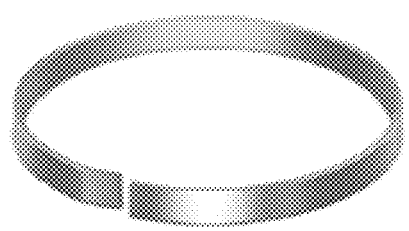
FIG. 14d illustrates different types of retaining rings for locking the inner carabiner with swivel cylinder, according to an embodiment as disclosed herein.

FIGS. 14a-14dd illustrates different types of retaining rings for locking the inner carabiner 104 with Swivel Cylinder 114, according to an embodiment as disclosed herein. The retaining ring(s) 902 can be used instead of the locking pins 112 to locking the inner carabiner 104 to the swivel cylinder 114. The retaining ring(s) 902 can be of different types, for example but not limited to the retaining ring (as shown in FIG. 14a), a constant section retaining ring (as shown in FIG. 14b), a spiral retaining ring (as shown in FIG. 14c) and a hoop ring (as shown in FIG. 14dd). These retaining rings can be used instead of the locking pins to connect the inner carabiner 104 to the swivel cylinder 114.

Figure 15:
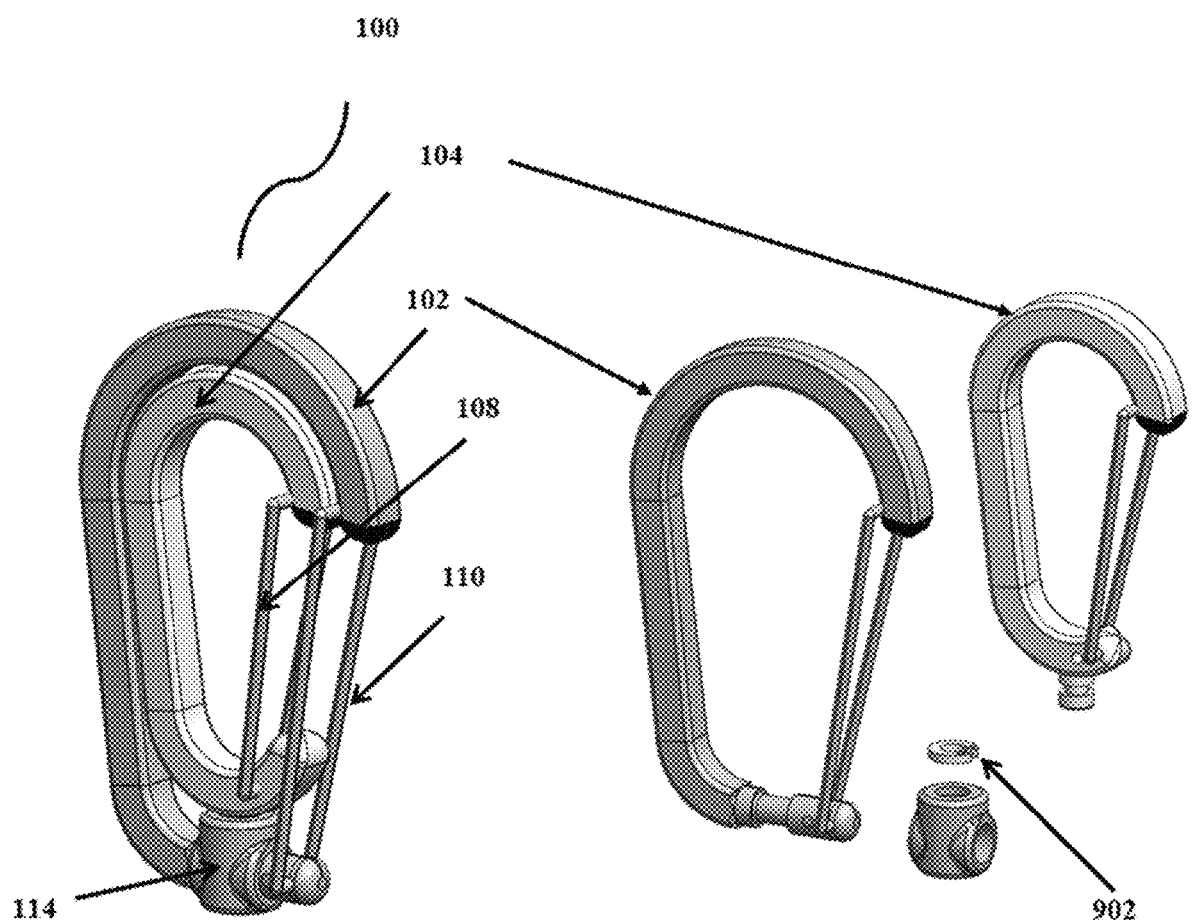
FIG. 15 is an example illustration of the 360-degree double carabiner 100 with a retaining ring, according to an embodiment as disclosed herein.

FIG. 15 is an example illustration of the 360-degree double carabiner 100 with the retaining ring 902, according to an embodiment as disclosed herein. The embodiments herein, wherein the 360-degree double carabiner 100 can have a square or rectangular shaped inner carabiner 104 and the outer carabiner 102. Further, the retaining ring 902 can be used to lock the square or rectangular shaped inner carabiner 104 and the outer carabiner 102 to the swivel cylinder 114 as shown in FIG. 15

Figure 16:
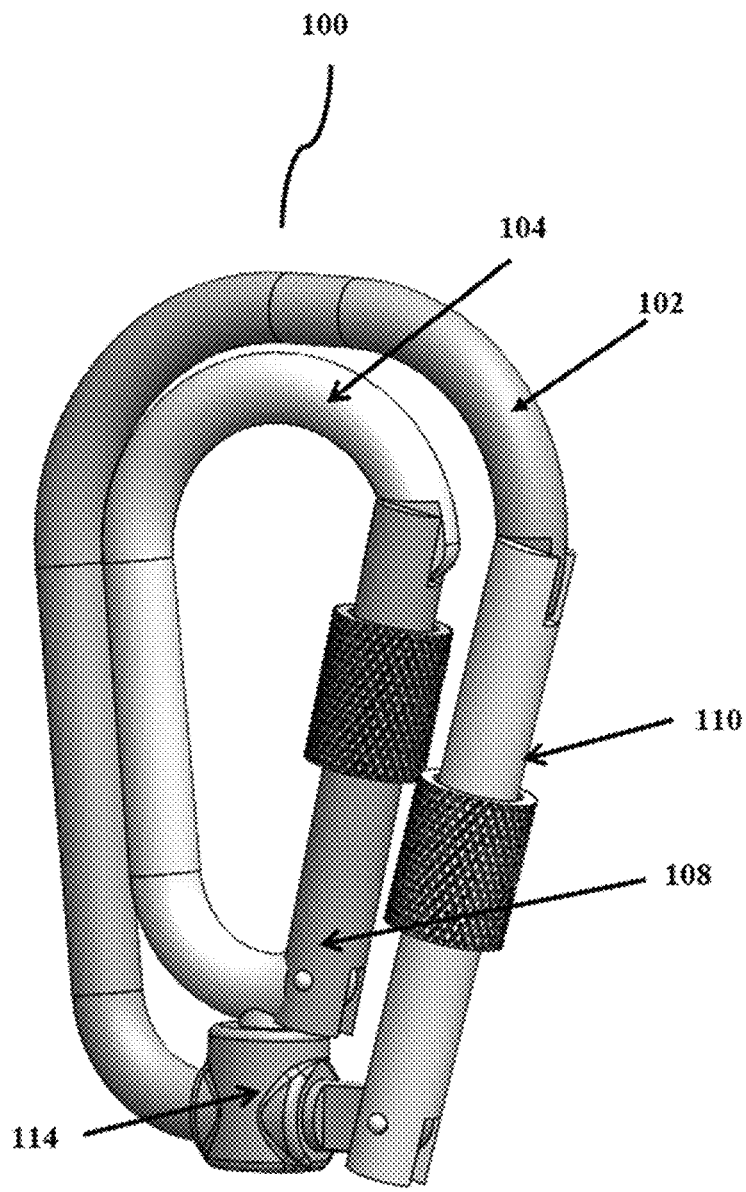
FIG. 16 is an example illustration of the 360-degree double carabiner 100, according to an embodiment as disclosed herein.

FIG. 16 is an example illustration of the 360-degree double carabiner 100, according to an embodiment as disclosed herein. The embodiments herein, wherein the 360-degree double carabiner 100 can have a non-locking and self-locking gate lock like Screw Lock, Triact Lock or Ball Lock as shown in the FIG. 16.

The foregoing description of the specific embodiments will so fully reveal the general nature of the embodiments herein that others can, by applying current knowledge, readily modify and/or adapt such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A 360-degree double carabiner, the 360-degree double carabiner comprising:
    an outer carabiner;
    an inner carabiner;
    a swivel joint, wherein the swivel joint includes a swivel cylinder and two locking pins, wherein the outer carabiner is enabled into a horizontal hole and the inner carabiner is enabled into a vertical hole of the swivel cylinder, wherein the two locking pins are enabled into two smaller holes present in the swivel cylinder to lock the outer carabiner and the inner carabiner to the swivel cylinder;
    an outer latch, wherein one end of the outer latch is fixed at a proximal end of the outer carabiner and another end of the outer latch rests on a distal end of the outer carabiner, wherein the outer latch is enabled to operate between an open position and a closed position to lock and unlock the outer latch at the distal end of the outer carabiner; and
    an inner latch, wherein one end of the inner latch is fixed at a proximal end of the inner carabiner and another end of the inner latch rests on a distal end of the inner carabiner, wherein the inner latch is enabled to operate between an open position and a closed position to lock and unlock the inner latch at the distal end of the inner carabiner.

2. The 360-degree double carabiner as claimed in claim 1, wherein the swivel joint, with the swivel cylinder and the two locking pins, enables the 360-degree motion of the outer carabiner and the inner carabiner.

3. The 360-degree double carabiner as claimed in claim 1, wherein the inner carabiner restricts the swivel cylinder and the inner carabiner from moving left or right and also prevents the inner carabiner from accidently coming out of the outer carabiner.

4. The 360-degree double carabiner as claimed in claim 1, wherein the inner carabiner is folded inside the outer carabiner.

5. A 360-degree double carabiner, the 360-degree double carabiner comprising:

an outer carabiner;

an inner carabiner;

a swivel joint, wherein the swivel joint includes a swivel cylinder and a retaining ring, wherein the outer carabiner is enabled into a horizontal hole and the inner carabiner is enabled into a vertical hole of the swivel cylinder, wherein the retaining ring locks the outer carabiner and the inner carabiner to the swivel cylinder;

an outer latch, wherein one end of the outer latch is fixed at a proximal end of the outer carabiner and another end of the outer latch rests on a distal end of the outer carabiner, wherein the outer latch is enabled to operate between an open position and a closed position to lock and unlock the outer latch at the distal end of the outer carabiner; and an inner latch, wherein one end of the inner latch is fixed at a proximal end of the inner carabiner and another end of the inner latch rests on a distal end of the inner carabiner, wherein the inner latch is enabled to operate between an open position and a closed position to lock and unlock the inner latch at the distal end of the inner carabiner.

6. The 360-degree double carabiner as claimed in claim 5, wherein the retaining ring is one of a constant section retaining ring, a spiral retaining ring and a hoop ring.

7. The 360-degree double carabiner as claimed in claim 5, wherein the swivel joint, with the swivel cylinder and the retaining ring, enables the 360-degree motion of the outer carabiner and the inner carabiner.

8. The 360-degree double carabiner as claimed in claim 5, wherein the inner carabiner restricts the swivel cylinder and the inner carabiner from moving left or right and also prevents the inner carabiner from accidently coming out of the outer carabiner.

9. The 360-degree double carabiner as claimed in claim 5, wherein the inner carabiner is folded inside the outer carabiner.

\* \* \* \* \*